United States Patent
Warkentin et al.

(10) Patent No.: US 9,383,935 B1
(45) Date of Patent: Jul. 5, 2016

(54) SECONDARY CPU MMU INITIALIZATION USING PAGE FAULT EXCEPTION

(71) Applicant: VMware, Inc., Palo Alto, CA (US)

(72) Inventors: Andrei Warkentin, Wakefield, MA (US); Harvey Tuch, Cambridge, MA (US)

(73) Assignee: VMware, Inc., Palo Alto, CA (US)

(*) Notice: Subject to any disclaimer, the term of this patent is extended or adjusted under 35 U.S.C. 154(b) by 21 days.

(21) Appl. No.: 14/572,505

(22) Filed: Dec. 16, 2014

(51) Int. Cl.
  *G06F 12/10* (2006.01)
  *G06F 3/06* (2006.01)
  *G06F 9/44* (2006.01)

(52) U.S. Cl.
  CPC ............ *G06F 3/0632* (2013.01); *G06F 3/0604* (2013.01); *G06F 3/0673* (2013.01); *G06F 9/4401* (2013.01); *G06F 9/4403* (2013.01)

(58) Field of Classification Search
  CPC ... G06F 3/0632; G06F 3/0604; G06F 9/4401; G06F 9/4403
  See application file for complete search history.

(56) References Cited

U.S. PATENT DOCUMENTS

| | | | | |
|---|---|---|---|---|
| 2006/0149954 A1* | 7/2006 | Hageman | ............... | G06F 9/4403 713/1 |
| 2012/0023319 A1* | 1/2012 | Chin | ..................... | G06F 9/4418 713/2 |
| 2012/0254499 A1* | 10/2012 | Hashimoto | ............. | G06F 9/445 711/102 |

* cited by examiner

*Primary Examiner* — Hiep Nguyen (57) ABSTRACT

In a computer system with multiple central processing units (CPUs), initialization of a memory management unit (MMU) for a secondary CPU is performed using an exception generated by the MMU. In general, this technique leverages the exception handling features of the secondary CPU to switch the CPU from executing secondary CPU initialization code with the MMU "off" to executing secondary CPU initialization code with the MMU "on." Advantageously, in contrast to conventional techniques for MMU initialization, this exception-based technique does not require identity mapping of the secondary CPU initialization code to ensure proper execution of the secondary CPU initialization code.

20 Claims, 5 Drawing Sheets

Secondary CPU Bring-Up Code
190

Secondary CPU Bring-Up Configuration Data
192 x1 - OS "TTBR_ELx" ("PA")
x2 - OS "VBAR_ELx" ("VA")
x3 - OS "SCTLR_ELx", with M bit set, signifying MMU enable
x4 - "VA" of the APContinue label below
x5 - "VA" of remainder of "AP" "bring up" code not seen here
x6 - "VA" of secondary PTE of affected VA with valid but not present entry
x7 - affected "VPN"

Secondary CPU Bring-Up Code Part 1
194

```
APStart:
msr "VBAR_ELx", x4
msr "TTBR0_ELx", x1
tlbi "ALLEx"
dsb sy
isb // wait until above CPU registers are really stored
msr spsel, #0 // switch to EL0 stack
msr "SCTLR_ELx", x3
dsb sy
isb // Once MMU is on we should start executing at APContinue on
    a page fault
1: b 1b // ...we never get here
.align 12 // Important alignment necessary for "VBAR_ELx" values
```

Secondary CPU Bring-Up Code Part 2
196

```
APContinue:
msr "VBAR_ELx", x2 // set real OS "VBAR_ELx"
msr "ELR_ELx", x5
ldr x8, [x6] // load KPT entry
orr x8, x8 =1 // mark valid
str x8, [x6] // store KPT entry
dc cvau, x6 // flush to point of coherence modified KPT entry
dsb sy
isb
tlbi "VAEx", x7 // invalidate for affected VA
dsb sy
isb
eret
```

FIGURE 5

SECONDARY CPU MMU INITIALIZATION USING PAGE FAULT EXCEPTION

BACKGROUND

As part of "bringing up" a multiple central processing unit (CPU) system, an operating system (OS) that is executing on a bootstrap CPU (the CPU on which an OS kernel is initialized first on) brings up one or more secondary CPUs (here bring-up refers to the OS procedure for initializing the secondary CPUs). Each secondary CPU starts executing in a known initial state that is defined by the architecture or firmware. Typically, in this initial state, virtual memory translation is not performed—virtual addresses (VAs) identity map to physical addresses (PAs). During bring-up, a memory management unit (MMU) is activated and the initial known state is supplanted by an operational state in which the MMU translates VAs to PAs based on a page table translation hierarchy tailored for the specific secondary CPU.

Since the manner in which the secondary CPU interprets addresses for data and instruction fetches is dramatically impacted by activating the MMU, the bring-up may be corrupted unless the bring-up code, also known as the initialization code, is located at the same addresses irrespective of the MMU state. More specifically, suppose that the MMU is activated and the bring-up code is not located at the same address before and after activating the MMU. In such a scenario, although instructions may continue to use stale mappings and execute as expected until translation lookaside buffer entries have been flushed, eventually the secondary CPU will execute an instruction fetch that either fails or returns an unintended value compromising the bring-up process. Since VAs are equal to PAs in the initial state, ensuring that the addresses of the bring-up code are unchanged when the MMU is activated is known as "mapping" the bring-up code "1:1." 1:1 is also referred to as identify mapping, in which the value of the VA is the same as the PA in the mapping.

In this 1:1 mapping approach, choosing a memory location for the bring-up code involves selecting an address for both the PA and the VA of the bring-up code that does not conflict with any kernel code or data. On some architectures, choosing such a memory location is relatively easy. For instance, on Intel®IA-32 and AMD®64 architectures, the bring-up code is typically located in memory below 1 MB—an area of memory that is usually reserved in advance, and that does not include PAs for OS kernel code and data structures.

By contrast, on other architectures, selecting a valid 1:1 mapping for the bring-up code is more difficult. For instance, on ARM®64 architectures memory may be located at arbitrary locations for varying platform implementations. Consequently, ensuring that an address for both the PA and the VA of the bring-up code does not match a VA that corresponds to valid kernel code or data may be impossible. If the PA for the bring-up code is equivalent to a VA that corresponds to valid kernel code or data, then the execution flow of the bring-up code is unintentionally diverted to this valid kernel code or data when the MMU is activated, and bring-up will typically fail. Consequently, a more flexible and comprehensive approach to initializing MMUs during bring-up of secondary CPUs is desirable.

SUMMARY

One or more embodiments provide techniques to initialize a memory management unit to perform address translation for a secondary central processing unit (CPU). A method of initializing a memory management unit (MMU) to perform virtual address to physical address memory mapping for a secondary central processing unit (CPU) in a multiple CPU system includes the steps of: executing an activation instruction to cause the memory management unit to perform address mapping based on page tables; attempting to fetch an instruction at a first virtual address sequentially following an address of the activation instruction and triggering an exception because the first virtual address does not have a mapping to a physical address in the page tables; responsive to the exception, fetching an instruction at a second virtual address that has a mapping to a physical address in the page tables, and executing the instruction at the second virtual address, where the physical address to which the second virtual address is mapped corresponds to a physical address of an instruction to initialize the secondary CPU.

Further embodiments of the present invention include a non-transitory computer-readable storage medium comprising instructions that cause a multiple central processing unit computer system to carry out one or more of the above methods as well as a multiple central processing unit computer system configured to carry out one or more of the above methods.

Advantageously, leveraging the exception handling features of a secondary CPU enables efficient bring-up of a MMU for the secondary CPU without constraining the virtual to physical memory mapping of the bring-up code to identity mapping. By decoupling the virtual and physical memory mapping of the bring-up code, architectures in which memory is located at arbitrary locations for varying platform implementations may be supported irrespective of conflicts between the physical addresses of the bring-up code and the virtual addresses of the OS kernel core and data structures.

DETAILED DESCRIPTION

Figure 1:
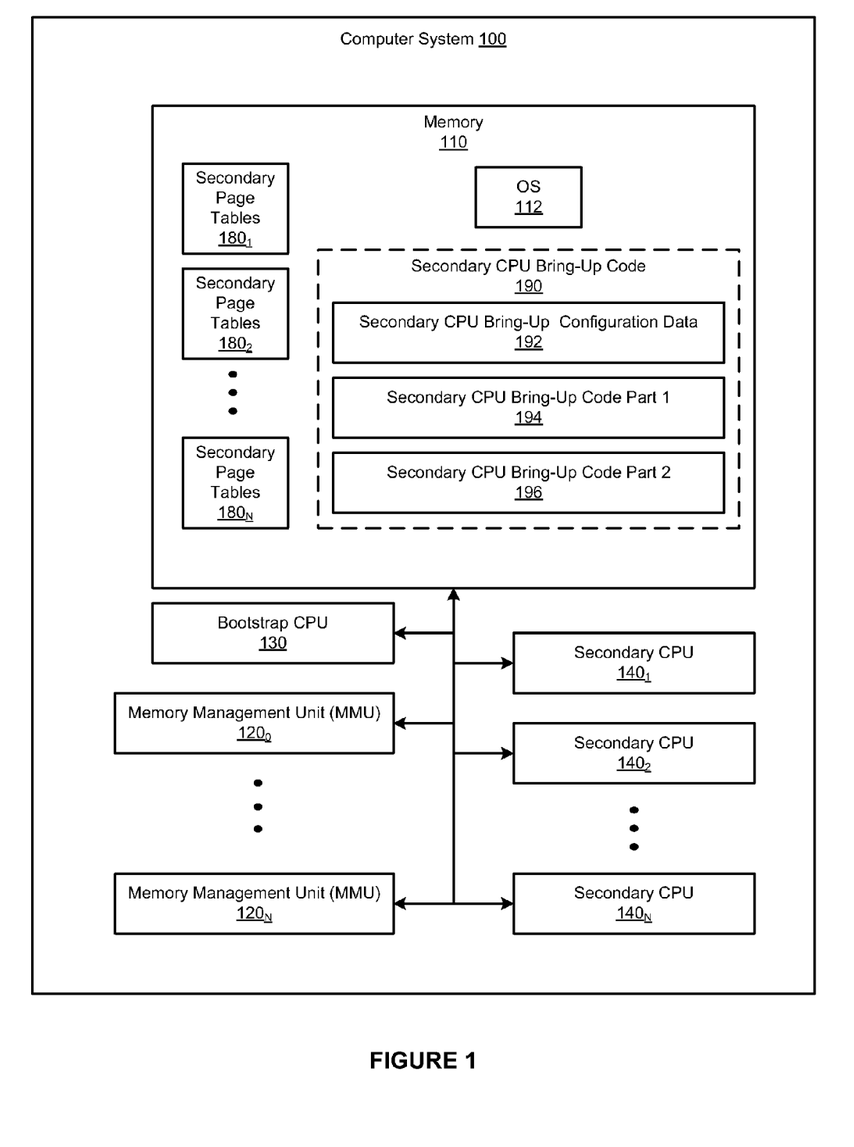
FIG. 1 is a block diagram of a multiple central processing unit (CPU) computer system in which one or more embodiment of the present invention may be implemented.

FIG. 1 is a block diagram of a multiple central processing unit (CPU) computer system 100 in which one or more embodiments of the present invention may be implemented. Computer system 100 may be constructed on a desktop, laptop or server grade hardware platform. As shown, computer system 100 includes a bootstrap central processing unit (CPU) 130, one or more secondary CPUs 140, a memory 110, and memory management units (MMUs) 120. Bootstrap CPU 130, secondary CPUs 140, memory 110, and MMUs 120 may be connected in any technically feasible fashion, such as via a system bus.

Bootstrap CPU 130 and secondary CPUs 140 are general-purpose processing units that can perform most tasks. For instance, an operating system 112 (stored in memory 110) may execute instructions on bootstrap CPU 130 and secondary CPUs 140 in any combination. However only bootstrap CPU 130 orchestrates initialization procedures (typically at start-up or reset) for computer system 100—including secondary CPUs 140. Notably, such initialization procedures include transitioning each secondary CPU 140 from an initial state that is defined by the architecture or firmware to a desired operational state.

Each of bootstrap CPU 130 and secondary CPUs 140 is associated with a different MMU 120. In the initial state, MMUs 120 are inactive for secondary CPUs 140, and virtual memory translation is not performed—virtual addresses (VAs) identity map to physical addresses (PAs). As part of bringing-up each secondary CPU 140, MMU 120 is activated for secondary CPU 140 and begins translating VAs to PAs based on per-CPU secondary page tables 180 tailored for the specific secondary CPU 140 and stored in memory 110.

In general, as referred to herein, the corresponding MMU 120 is considered inactive (or "off") for a secondary CPU 140 when VAs identity map to physical PAs for secondary CPU 140. Conversely, the corresponding MMU 120 is considered active (or "on") for secondary CPU 140 when MMU 120 maps VAs to PAs based on the corresponding secondary page tables 180. MMU 120 may be activated and inactivated in any technically feasible fashion. For instance, a system control register in secondary CPU 140 may include a "MMU enable" bit that OS 112 sets to enable VA translation and clears to disable VA translation.

In conventional computer systems, code that is used to bring-up a secondary CPU, referred to herein as both secondary CPU bring-up code and secondary CPU initialization code, is often identity mapped between virtual and physical address spaces. Such a mapping is designed to ensure that when the secondary CPU bring-up code activates the MMU for secondary CPU, the sequence of instructions is not corrupted by the accompanying memory mapping change. However, in some architectures, memory may be located at arbitrary locations across varying platform implementations. Consequently, the value of the PA assigned to the bring-up code may match the VA assigned to kernel code or data. In such a scenario identity mapping is not possible, and conventional computer systems that rely on identity mapping of secondary CPU bring-up code crash or otherwise fail to initialize properly.

For this reason, embodiments provide secondary CPU bring-up code 190 that does not rely on identity mapping of secondary CPU bring-up code 190 to ensure the desired instruction execution sequence. Notably, secondary CPU bring-up code 190 leverages a page fault exception on instruction fetch to switch secondary CPU 140 from executing secondary CPU bring-up code part 1 194 with MMU 120 inactive to executing secondary CPU bring-up code part 2 196 with MMU 120 active. Although depicted as separate components in FIG. 1, secondary CPU bring-up code part 1 194 may or may not be contiguous in physical and/or virtual address space with secondary CPU bring-up code part 2 196.

In addition to secondary CPU bring-up code part 1 194 and secondary CPU bring-up code part 2 196, secondary CPU bring-up code 190 includes secondary CPU bring-up configuration data 192. Secondary CPU bring-up configuration data 192 is used by secondary CPU bring-up code part 1 194 and secondary CPU bring-up code part 2 196 to precipitate the page fault exception and, subsequently, to transition secondary CPU 140 to the target operational state. Although not shown, secondary CPU bring-up code 190 may also include "remaining" (or part 3) secondary CPU bring-up code that secondary CPU 140 executes after returning from the page fault exception.

Figure 2:
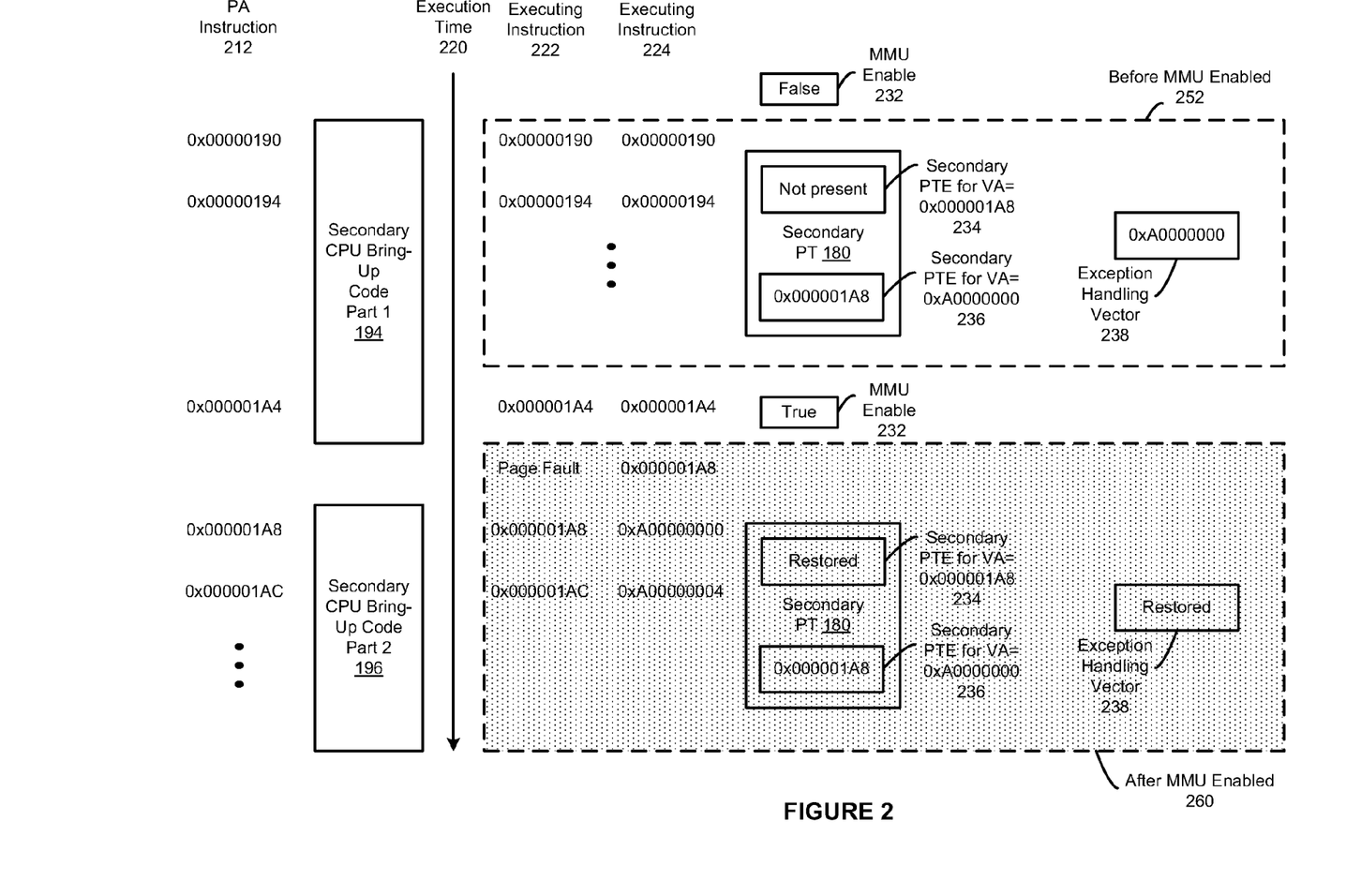
FIG. 2 is a conceptual diagram that illustrates how secondary CPU bring-up code initializes a memory management unit for a secondary CPU, according to one embodiment.

FIG. 2 is a conceptual diagram that illustrates how secondary CPU bring-up code 190 initializes memory management unit 120 for secondary central processing unit 140, according to one embodiment. As depicted in the column "PA instruction 212", secondary CPU bring-up code part 1 194 includes instructions that begin at PA "0x00000190" and end at PA "0x000001A4," and are executed with PA equal to VA. By contrast, secondary CPU bring-up code part 2 196 includes instructions that begin at PA "0x000001A8," and are executed with PA not equal to VA. As noted above, CPU bring-up code part 1 194 and CPU bring-up code part 2 196 may or may not be in contiguous memory locations.

An execution time arrow 220 depicts the progress of the instructions as time passes. At various points in time, the PA of the executing instruction (labelled as a "PA executing instruction 222)", the VA of the executing instruction (labelled as a "VA executing instruction 224)", the state of various system registers, and selected page table entries (PTEs) in secondary page tables 180 are illustrated. It should be understood that although PTEs are referred to herein as mapping VAs to PAs, the PTEs are at the granularity of pages, and each PTE maps a virtual address of a page to the address of a physical frame.

Initially, OS 112 sets an MMU enable 232 included in a system register of secondary CPU 140 to "false," ensuring VAs are identity mapped to PAs. OS 112 also sets up secondary pages tables 180 for eventual use by secondary CPU 140, and selects a "mapped continuation VA" that does not conflict with the VAs of any valid page table entry (PTE) mappings included in secondary page tables 180. Advantageously, OS 112 capitalizes on the opportunity to choose a mapped continuation VA independently of any PA, thereby enabling OS 112 to relatively easily adhere to any architecture or platform VA constraints. For explanatory purposes only, the context of FIG. 2 is that OS 112 selects VA "0xA0000000" as the mapped continuation VA. OS 112 sets the PTE for the selected mapped continuation VA, shown as "secondary PTE for VA=0xA0000000" 236 to map to the PA of secondary CPU bring-up code part 2 196—PA "0x000001A8."

The final instruction included in secondary bring-up code part 1 is an instruction that activates MMU 120 to translate VAs to PAs using secondary page tables 180. As is well-known, after execution of this activation instruction, secondary CPU 140 will fetch the next instruction using the next sequential VA. To control the execution flow, OS 112 modifies the PTE for this next sequential VA to trigger a page fault exception, thereby enabling OS 112 to respond to the exception instead of executing the instruction at the next sequential VA.

As shown, because the PA of the last instruction included in secondary CPU bring-up code part 1 is PA "0x000001A4," OS 112 modifies a "secondary PTE for VA="0x000001A8" 234 to indicate that the mapping is "not present." In alternate embodiments, OS 112 may temporarily overwrite the "true" mapping captured in secondary PTE for VA="0x000001A8" 234 with an invalid address, and store this true mapping in memory 110 or registers via secondary CPU bring-up configuration data 192. In general, OS 112 stores various data for use by secondary bring-up code part 1 194 and secondary bring-up code part 2 196 in memory 110 or registers via secondary CPU bring-up configuration data 192.

During "a before MMU enabled" 252 state, instructions included in secondary CPU bring-up code part 1 194 cause secondary CPU 140 to install secondary page tables 180 and set the value of exception handling vector 238 to the mapped continuation VA "0xA0000000." In operation, the final instruction in secondary CPU bring-up code part 1 (at VA "0x000001A4" sets MMU enable 232 to "true," activating MMU 120.

Secondary CPU 140 is now operating in an "after MMU enabled" 260 state and attempts to fetch the next sequential instruction via VA "0x000001A8." Because "secondary PTE for VA=0x000001A8" 234 is invalid, this attempt triggers a page fault exception. In response to the page fault exception, secondary CPU 140 routes control to the VA specified by exception handling vector 238—the mapped continuation VA "0xA0000000." Advantageously, secondary CPU 140 takes exceptions in the address space in which they were generated. Consequently, secondary CPU 140 fetches and executes the next instruction based on "secondary PTE for VA=0xA0000000" 236, and secondary CPU 140 begins executing secondary CPU bring-up code part 2 196.

In "after MMU enabled" 260 state, instructions included in secondary bring-up code part 2 196 set a bit in "secondary PTE for VA=0x000001A8" to "present," thereby restoring the mapping VA 0x000001A8 to the "real" PA. Further, secondary bring-up code part 2 196 causes secondary CPU 140 to restore the value of exception handling vector 238 to the VA of exception handling code. In general, secondary bring-up code part 2 196 may include any number of instructions that assign and/or restore the desired operational state of secondary CPU 140.

Figure 3:
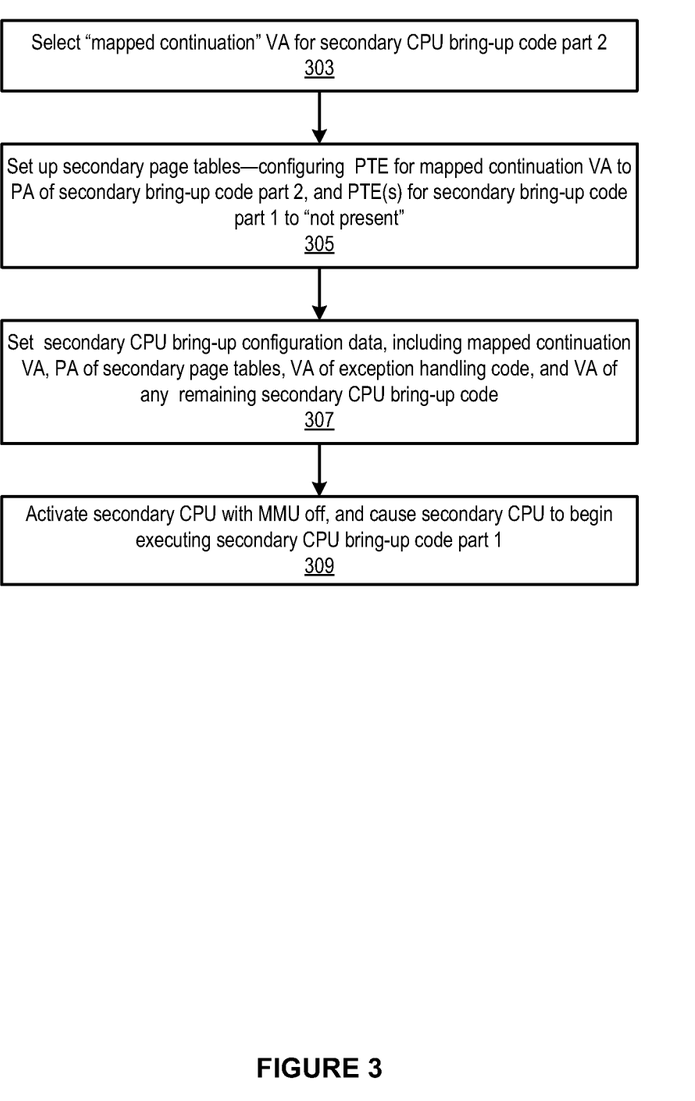
FIG. 3 depicts a flow diagram of method steps for generating page tables and other configuration data accessed by secondary CPU bring-up code, according to one embodiment.

FIG. 3 depicts a flow diagram of method steps for generating page tables and other configuration data accessed by secondary CPU bring-up code, according to one embodiment. For explanatory purposes only, this method describes method steps for generating secondary page tables 180 and secondary CPU bring-up configuration data 192 associated with a single secondary CPU 140. However CPU-specific secondary page tables 180 and secondary CPU bring-up configuration data 192 associated with any number of secondary CPUs 140 may be generated using these method steps.

As shown, this method begins at step 303, where OS 112, executing on bootstrap CPU 130, selects a "mapped continuation" VA for secondary CPU bring-up code part 2 196. OS 112 may select this VA using any technique that ensures that the selected VAs for secondary CPU bring-up code part 2 196 do not overlap the mapped VAs for any kernel code or data—reflecting any architecture and platform constraints associated with secondary CPU 140. As used herein "mapped" refers to the VA to PA translation performed by MMU 120 after activation and using secondary page tables 180. Notably, the value of the "mapped continuation" VA for secondary CPU bring-up code part 2 196 may or may not equal the value of the PA for secondary CPU bring-up code part 2 196. Further, the VA with the value equal to the PA for secondary CPU bring-up code part 2 196 may be mapped to a different PA, such as a page of kernel code.

At part of step 303, OS 112 generates secondary page tables 180. At step 305, OS 112 modifies the PTE corresponding to the mapped continuation VA to map to the PA for secondary CPU bring-up code part 2 196. Further, OS 112 modifies the page table entry (PTE) corresponding to secondary CPU bring-up code part 1 194 to reflect a state of "not present." In some embodiments, OS 112 conveys the state of "not present" via a false value for a "present" bit in PTE. In alternate embodiments, OS 112 sets the PA of the PTE to an invalid address to convey the state of "not present." For explanatory purposes only, PTEs are referred to as mapping VAs to PAs, however as is well-known, the granularity of PTEs is at the page level, and each PTE maps a virtual address of a page to the address of a physical frame. In general, step 303 may be replaced with any technically feasible process that ensures that secondary page tables 180 do not map secondary CPU bring-up configuration code part 1 194, but map secondary CPU bring-up configuration code part 2 196.

At step 307, OS 112 generates secondary CPU bring-up configuration data 192. In general, CPU bring-up configuration data 192 includes values stored in memory 110 or registers that are used by secondary CPU bring-up code part 1 194 and secondary CPU bring-up code part 2 194. In particular, CPU bring-up configuration data 192 enables secondary bring-up code 190 to smoothly transition secondary CPU 140 from operating in an identity-mapped virtual address space to a virtual address space that is mapped using secondary page tables 180. More specifically, OS 112 generates CPU bring-up configuration data 192 that includes values for the mapped continuation VA, the PA of secondary page tables 180, and the VA of exception handling code. In some embodiments OS 112 generates additional CPU bring-up configuration data 192, such as the VA of any secondary CPU bring-up code 190 that is intended to be executed following secondary CPU bring-up code part 2 196. In embodiments in which the OS 112 sets the PA of the PTE corresponding to secondary CPU bring-up code part 1 194 to an invalid address, OS 112 includes the temporarily supplanted PA in the secondary CPU bring-up configuration data 192—enabling eventually restoration of the invalidated PTE. More specifically, such a process enables secondary bring-up code 190 to "hide" the mapping for any kernel VA that matches a PA in secondary CPU bring-up code 1 194 and then "unhide" the mapping for this kernel VA after successfully transitioning to secondary CPU bring-up code part 2 196.

At step 309, OS 112 activates secondary CPU 140 with MMU 120 off, and causes secondary CPU 140 to begin executing secondary CPU bring-up code part 1 194. OS 112 may activate secondary CPU 140 in any technically feasible fashion. For example, if secondary CPU 140 is powered-off, then OS 112 powers-on secondary CPU 140. Alternatively, if secondary CPU 140 is powered-on and is executing a "wait for interrupt," then OS 112 sends an interrupt signal to secondary CPU 140. In some embodiments, OS 112 may not turn MMU 120 off, but instead configures MMU 120 to perform identity mapping or bypass the mapping logic. This method ends after step 309. In general, after step 309, secondary CPU 140 executes secondary bring-up code part 1 194 and secondary bring-up code part 2 196, initializing MMU 120 to perform address mapping using secondary page tables 180.

Figure 4:
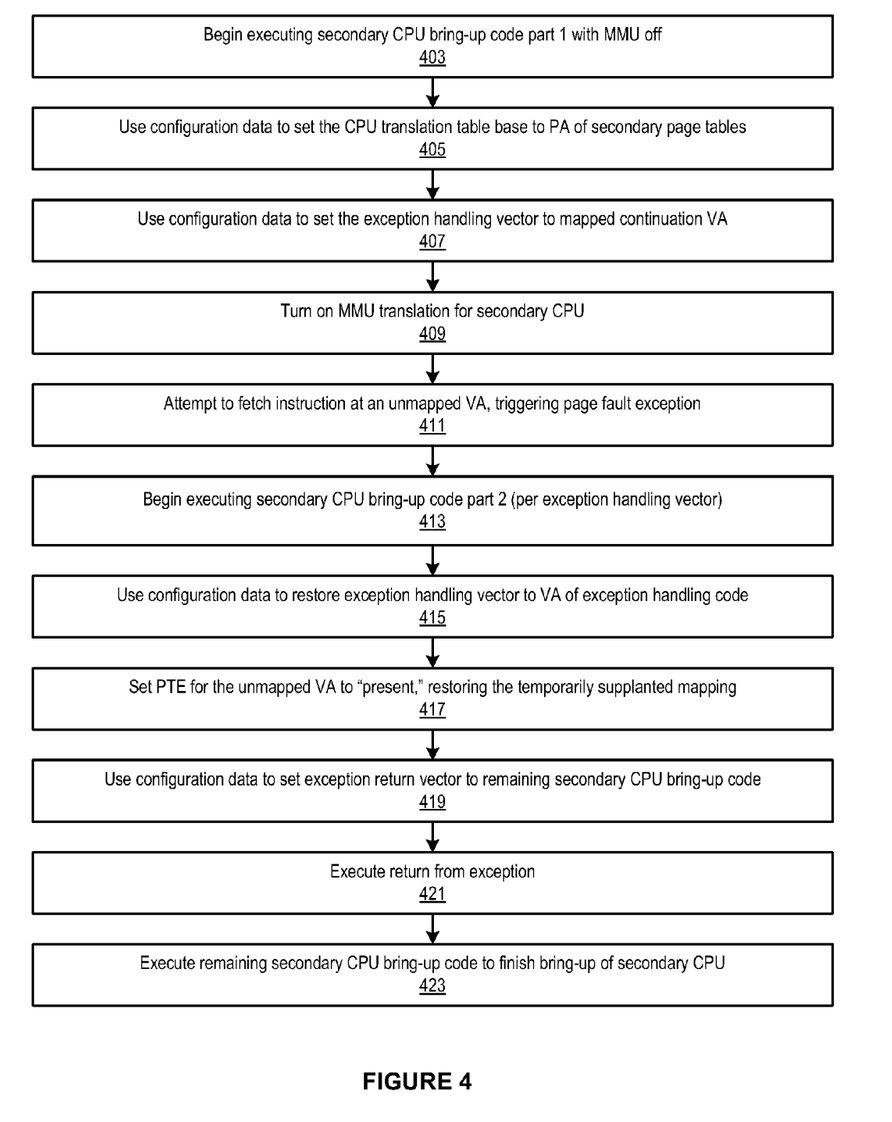
FIG. 4 depicts a flow diagram of method steps for initializing a memory management unit during bring-up of a secondary CPU, according to one embodiment.

FIG. 4 depicts a flow diagram of method steps for initializing a memory management unit during bring-up of a secondary CPU, according to one embodiment. The context of this flow is that OS 112, executing on bootstrap CPU 130, has tailored secondary bring-up CPU code 190 to configure MMU 120 to perform non-identity address mapping for secondary CPU 140 based on secondary page tables 180. In alternate embodiments, any code, including secondary bring-up CPU code 190, may configure any number of secondary bring-up CPU codes 190 to bring up any number of secondary CPUs 140.

At step 403, secondary CPU 140 beings executing secondary CPU bring-up code part 1 194. Typically, secondary CPU 140 starts in a known initial state that is unpaged, or uses identity mapping with virtual memory translation off (i.e., a value for VA translates to the same value for PA). Although such an initial unpaged state may be achieved in any technically feasible fashion, such as bypassing the mapping logic in MMU 120, this identity mapping is referred to herein as MMU 120 being "off." Notably, as part of executing secondary CPU bring-up code part 1 194, secondary CPU 140 fetches instructions using sequential increasing VAs.

The instructions in secondary CPU bring-up code part 1 194 direct secondary CPU 140 to use secondary CPU bring-up configuration data 192 (part of secondary CPU bring-up code 190) to set various system registers in secondary CPU 140. Secondary CPU bring-up code part 1 194 may orchestrate the configuration of these system registers in any technical feasible fashion. For example, secondary CPU bring-up configuration data 192 may specify memory 110 or registers containing values that instructions in secondary CPU bring-up code part 1 194 and secondary CPU bring-up code part 2 load into strategic system registers. Notably, secondary CPU bring-up code part 1 194 includes instructions that cause secondary CPU 140 to set the value of the translation table base register to the PA of secondary page tables 180 (step 405), and the value of exception handling vector 238 to mapped continuation VA (step 407). The mapped continuation VA is mapped to the PA of secondary CPU bring up code part 2 196 in secondary page tables 180, and consequently is the VA at which secondary CPU bring-up code part 2 196 "resides" after MMU 140 begins using secondary page tables 180.

At step 409, the instructions in secondary CPU bring-up code part 1 192 cause CPU 140 to turn "on" MMU 140. As used herein, turning "on" MMU 140 refers to any technique that transitions MMU 140 from an "off" state or otherwise performing identity mapping, to a state in which MMU 140 performs address translation using the page tables specified by the translation table base register (i.e., secondary page tables 180). Consequently, step 409 drastically alters the way in which secondary CPU 140 interprets addresses for data and instruction fetches.

As part of executing secondary CPU bring-up code part 1 194, at step 411, secondary CPU 140 attempts to fetch the next sequential instruction based on VAs. Since secondary CPU 140 accessed the prior instruction via a VA equal to a PA of secondary CPU bring up code part 1 194, secondary CPU 140 will attempt to fetch an instruction from the next sequential PA. Since MMU 140 is on, MMU 140 attempts to find a valid mapping for this VA in secondary page tables 180. However, the PTE in secondary page tables 180 for this VA is marked "not present" or is otherwise invalid (i.e., maps to an invalid PA). Consequently, attempting to fetch this instruction triggers an exception, such as a page fault.

At step 413, secondary CPU 140 continues execution at the instruction specified in exception handling register 238—the mapped continuation VA. Secondary CPU 180 takes exceptions in the same address space in which secondary CPU 180 was operating when the exception was triggered. Consequently, secondary CPU 180 forwards executions to the PA specified by the PTE for the mapped continuation VA. Because the PTE in secondary page tables 180 for the mapped continuation VA maps to the PA of secondary CPU bring-up code part 2 196, secondary CPU 180 fetches and executes the first instruction included in secondary CPU bring-up code part 2 196. In alternate embodiments, this method may be used to initialize any number and/or types of secondary CPUs that are architected or configured to handle exceptions in the same address space in which the exception was raised.

Secondary CPU 140 then executes instructions in secondary CPU bring-up code part 2 196 that set secondary page tables 180 and the exception handling vector to values that are appropriate for the new operational state. More specifically, at step 415, secondary CPU 140 executes instructions that load the VA of conventional exception handling code into exception handling vector 238. These instructions may direct secondary CPU 140 to load exception handling vector 238 in any technically feasible fashion. For instance, in some embodiments, the VA of the conventional exception handling code is stored in memory 110 or a register (assigned in secondary CPU configuration data 192) and CPU 140 loads the contents of the specified memory location or register into exception handling vector 238.

At step 417, secondary CPU 140 executes instructions that restore the mapping of the unmapped VA (equal to the PA sequentially following the instruction in secondary CPU bring-up code part 1 194 that turns on MMU 120). In this manner, the operational state now comprehensively maps the virtual address space to the physical address space—including the previously unmapped VA—without disturbing the intended flow of bring-up instructions. By contrast, in conventional MMU initialization techniques, this unmapped VA may be mapped to kernel code or data structures when MMU 120 is turned on, corrupting the intended instruction sequence and typically causing computer system 100 to perform unexpectedly and/or crash. The secondary CPU bring-up code part 2 196 may orchestrate the restoration of the temporarily supplanted mapping in any technically feasible fashion. In some embodiments, secondary CPU 140 toggles a "present" bit in the PTE from "false" to "true." In other embodiments, the "true" PA is stored in memory 110 or a register (assigned in secondary CPU configuration data 192) and secondary CPU 140 loads the contents of the specified memory location or register into the appropriate field in the PTE.

At step 419, secondary CPU 140 executes instructions that set an exception return vector to any remaining secondary CPU bring-up code 190 and then secondary CPU 140 executes a return from exception (step 421). Typically, the exception return vector is included in a memory 110 or a register in secondary CPU configuration data 192. However, alternate embodiments may employ alternative techniques. In some alternate embodiments, no return from exception is performed, instead execution is continued on secondary CPU 140 from the exception handler and steps 419-421 are omitted. At step 423, secondary CPU 140 executes any remaining secondary CPU bring-up code, completing the bring-up of secondary CPU 140.

Figure 5:
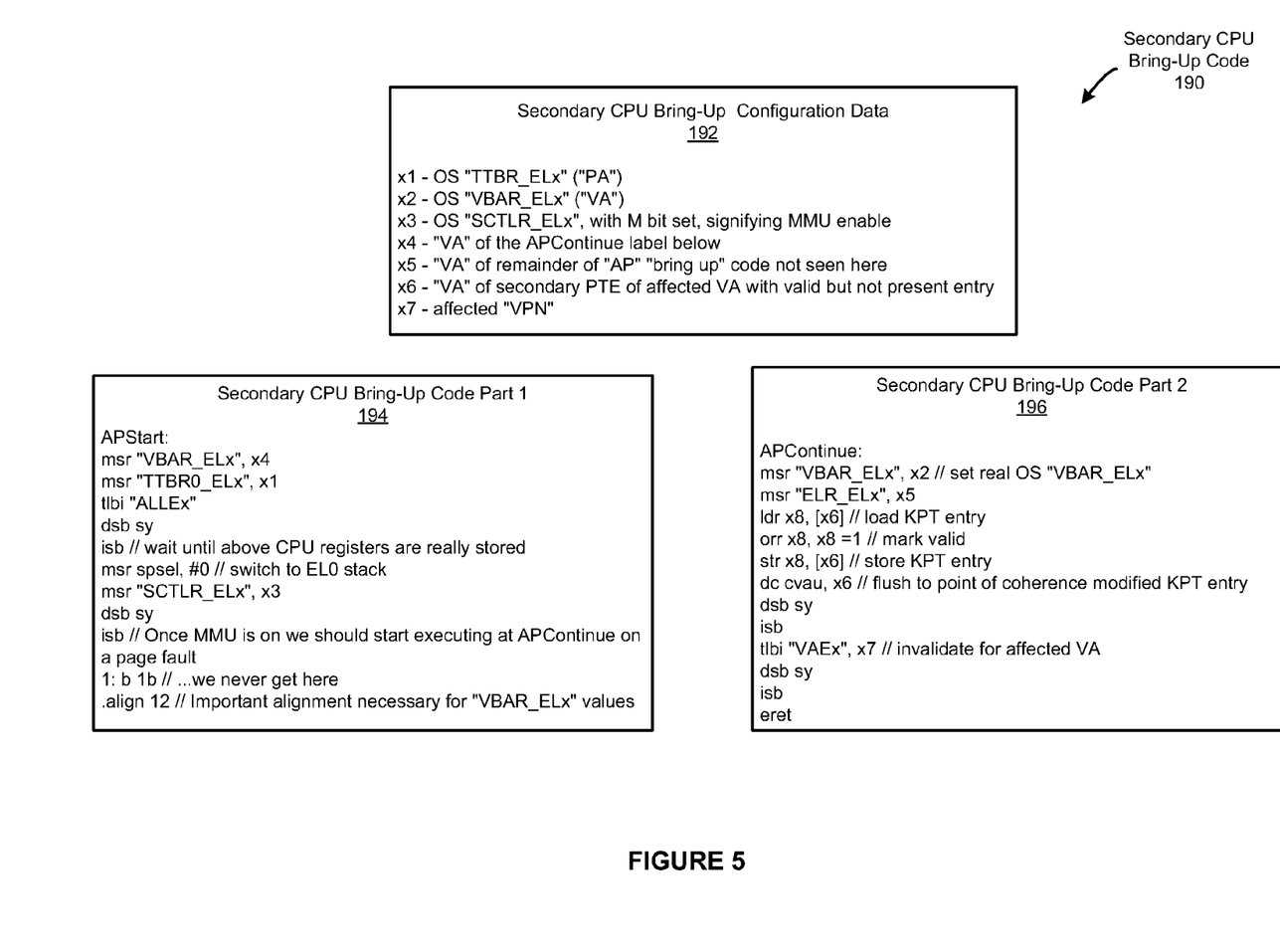
FIG. 5 is a conceptual diagram that illustrates secondary CPU bring-up code, according to one embodiment.

FIG. 5 is a conceptual diagram that illustrates secondary CPU bring-up code 190, according to one embodiment. OS 112 may tailor secondary CPU bring-up code 190 for any secondary CPU 140 that is capable of taking an exception in the address space from which the exception was generated. In particular, FIG. 5 illustrates portions of secondary CPU bring-up code 190 designed to bring-up secondary CPU 140 included in a particular computer system 100 that is operable in multiple privilege levels.

In general, as part of bringing-up secondary CPU 140, embodiments perform MMU initialization using a page fault exception as described herein. However, various embodiments include architecture-specific optimizations that are designed to leverage features of secondary CPU 140 to efficiently and effectively bring-up secondary CPU 140. For example, as shown in FIG. 5, throughout secondary CPU bring-up code 190, the privilege level is denoted by "ELx." More specifically, secondary CPU bring-up configuration data 192 loads register x2 with the "real" value of "VBAR_ELx," where VBAR_ELx is a CPU vector base address register that points to VA containing vectors for exception handling. If secondary CPU 140 is brought-up at privilege level "EL1," then the value loaded into register x2 is intended for "VBAR_EL1." In one embodiment, there are three different OS privilege levels. EL0 is the lowest privilege level which is for applications. EL1 is the next level which is for non-hypervisor kernels. EL2 is the highest level which is for hypervisors.

Further, because the architecture of this example secondary CPU 140 uses different exception offsets from "VBAR_ELx" depending on the stack mode, secondary CPU bring-up code part 1 194 includes an instruction "msr spsel, #0" that causes CPU 140 to switch to the EL0 stack before turning on the MMU 120. After MMU 120 is brought-up and the page fault execution is trigger on instruction fetch, CPU 140 executes secondary CPU bring-up code part 2 196, including an instruction ("msr "VBAR_ELx", x2") that sets the system register VBAR_ELx to register x2.

As FIG. 5 illustrates, secondary CPU bring-up code 190 may include a variety of instructions to setup the operational state for secondary CPU 140. However, despite implementation-specific differences, embodiments of secondary CPU bring-up code 190 share the technique of leveraging a page fault exception on instruction fetch to switch secondary CPU 140 from running code with MMU 120 off (not "mapped" in secondary page tables 180) to running code with MMU 120 on ("mapped" in secondary page tables 180).

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of initializing a memory management unit (MMU) to perform virtual address to physical address memory mapping for a secondary central processing unit (CPU) in a multiple CPU system, comprising:
   executing an activation instruction to cause the memory management unit to perform address mapping based on page tables;
   attempting to fetch an instruction at a first virtual address sequentially following an address of the activation instruction and triggering an exception because the first virtual address does not have a mapping to a physical address in the page tables; and
   responsive to the exception, fetching an instruction at a second virtual address that has a mapping to a physical address in the page tables, and executing the instruction at the second virtual address,
   wherein the physical address to which the second virtual address is mapped corresponds to a physical address of an instruction to initialize the secondary CPU.

2. The method of claim 1, wherein the exception comprises a page fault.

3. The method of claim 1, further comprising:
   prior to executing the activation instruction, setting the exception handling vector to the second virtual address; and
   after executing the instruction at the second virtual address, setting the exception handling vector to a third virtual address different from the second virtual address.

4. The method of claim 1, wherein setting the exception handling vector to the second virtual address comprises:
   transferring the contents of a memory location or register to a register that contains a CPU vector base address.

5. The method of claim 1, further comprising:
   setting an exception return vector to a virtual address of a second initialization instruction.

6. The method of claim 1, further comprising:
   modifying the page tables so that the first virtual address has a mapping to a physical address.

7. The method of claim 6, wherein modifying the page tables comprises:
   transferring the contents of a register that specifies the physical address to which the first virtual address is to be mapped to a page table entry that corresponds to the first virtual address.

8. The method of claim 6, wherein modifying the page tables comprises:

modifying a page table entry that corresponds to the first virtual address to indicate that the mapping to the physical address is present.

9. The method of claim 1, wherein executing the activation instruction comprises setting a system register of the secondary CPU to a value signifying "on," wherein the system register controls whether the MMU is "on" or "off".

10. A non-transitory computer-readable storage medium comprising instructions, which, when executed in a multiple central processing unit (CPU) computer system, causes a secondary CPU included in the computer system to carry out the steps of:

executing an activation instruction to cause a memory management unit (MMU) to perform address mapping based on page tables;

attempting to fetch an instruction at a first virtual address sequentially following an address of the activation instruction and triggering an exception because the first virtual address does not have a mapping to a physical address in the page tables; and responsive to the exception, fetching an instruction at a second virtual address that has a mapping to a physical address in the page tables, and executing the instruction at the second virtual address, wherein the physical address to which the second virtual address is mapped corresponds to a physical address of an instruction to initialize the secondary CPU.

11. The non-transitory computer-readable storage medium of claim 10, wherein the exception comprises a page fault.

12. The non-transitory computer-readable storage medium of claim 10, further comprising:

prior to executing the activation instruction, setting the exception handling vector to the second virtual address; and after executing the instruction at the second virtual address, setting the exception handling vector to a third virtual address different from the second virtual address.

13. The non-transitory computer-readable storage medium of claim 10, further comprising:

setting an exception return vector to a virtual address of a second initialization instruction.

14. The non-transitory computer-readable storage medium of claim 10, further comprising:

modifying the page tables so that the first virtual address has a mapping to a physical address.

15. The non-transitory computer-readable storage medium of claim 10, wherein executing the activation instruction comprises setting a system register of the secondary CPU to a value signifying "on," wherein the system register controls whether the MMU is "on" or "off".

16. A computer system comprising:

a memory management unit (MMU) that, when activated, performs virtual address to physical address mapping based on page tables;

a bootstrap processing unit that configures the page tables and a secondary CPU initialization code; and a secondary central processing unit (CPU), wherein the secondary CPU initialization code causes the secondary CPU to:

execute an activation instruction to cause the memory management unit to perform address mapping based on page tables;

attempt to fetch an instruction at a first virtual address sequentially following an address of the activation instruction and trigger an exception because the first virtual address does not have a mapping to a physical address in the page tables; and responsive to the exception, fetch an instruction at a second virtual address that has a mapping to a physical address in the page tables, and execute the instruction at the second virtual address, wherein the physical address to which the second virtual address is mapped corresponds to a physical address of an instruction to initialize the secondary CPU.

17. The computer system of claim 16, wherein the exception comprises a page fault.

18. The computer system of claim 16, wherein the secondary CPU initialization code further causes the secondary CPU to:

prior to executing the activation instruction, set the exception handling vector to the second virtual address; and after executing the instruction at the second virtual address, set the exception handling vector to a third virtual address different from the second virtual address.

19. The computer system of claim 16, wherein the secondary CPU initialization code further causes the secondary CPU to:

set an exception return vector to a virtual address of a second initialization instruction.

20. The computer system of claim 16, wherein the secondary CPU initialization code further causes the secondary CPU to:

modify the page tables so that the first virtual address has a mapping to a physical address.

* * * * *